United States Patent
Kidd et al.

(10) Patent No.: US 10,019,264 B2
(45) Date of Patent: Jul. 10, 2018

(54) SYSTEM AND METHOD FOR CONTEXTUAL VECTORIZATION OF INSTRUCTIONS AT RUNTIME

(71) Applicant: Intel Corporation, Santa Clara, CA (US)

(72) Inventors: Taylor W. Kidd, San Jose, CA (US); Matt S. Walsh, San Carlos, CA (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 15/052,765

(22) Filed: Feb. 24, 2016

(65) Prior Publication Data

US 2017/0242696 A1 Aug. 24, 2017

(51) Int. Cl.
*G06F 9/30* (2018.01)
*G06F 9/38* (2018.01)

(52) U.S. Cl.
CPC ........ *G06F 9/3016* (2013.01); *G06F 9/30105* (2013.01); *G06F 9/3802* (2013.01); *G06F 9/3836* (2013.01)

(58) Field of Classification Search
None
See application file for complete search history.

(56) References Cited

U.S. PATENT DOCUMENTS

| 7,249,350 | B2 * | 7/2007 | Wang | G06F 8/52 712/22 |
| 9,501,268 | B2 * | 11/2016 | Amiri | G06F 8/443 |
| 2007/0124722 | A1 * | 5/2007 | Gschwind | G06F 8/445 717/106 |
| 2008/0092124 | A1 * | 4/2008 | Archambault | G06F 8/445 717/140 |
| 2008/0140750 | A1 * | 6/2008 | Kershaw | G06F 7/768 708/490 |
| 2008/0141012 | A1 * | 6/2008 | Yehia | G06F 9/30036 712/226 |

(Continued)

OTHER PUBLICATIONS

International Search Report and Written Opinion for Application No. PCT/US2017/015052, dated Jun. 26, 2017, 17 pages.

*Primary Examiner* — Eric Coleman
(74) *Attorney, Agent, or Firm* — Nicholson De Vos Webster & Elliott, LLP

(57) ABSTRACT

Methods and apparatuses relating to processors that contextually optimize instructions at runtime are disclosed. In one embodiment, a processors includes a fetch circuit to fetch an instruction from an instruction storage, a format of the instruction including an opcode, a first source operand identifier, and a second source operand identifier; wherein the instruction storage includes a sequence of sub-optimal instructions preceded by a start-of-sequence instruction and followed by an end-of-sequence instruction. The disclosed processor further includes a decode circuit to decode the instruction, to detect the start-of-sequence instruction and the end-of-sequence instruction, to buffer the sequence of sub-optimal instructions there between, to access a lookup table to identify one or more optimized instructions to substitute for one or more of the sequence of sub-optimal instructions, and to select either the decoded instruction or the sequence of one or more optimized instructions to dispatch to an execution circuit.

20 Claims, 7 Drawing Sheets

(56) References Cited

U.S. PATENT DOCUMENTS

| | | | | |
|---|---|---|---|---|
| 2013/0067196 A1* | 3/2013 | Michalak | ............ | G06F 9/3017 |
| | | | | 712/7 |
| 2013/0290943 A1* | 10/2013 | Uliel | ............ | G06F 9/30032 |
| | | | | 717/160 |
| 2014/0096119 A1* | 4/2014 | Vasudevan | ............ | G06F 8/452 |
| | | | | 717/160 |
| 2014/0189331 A1* | 7/2014 | Lipshits | ............ | G06F 9/30065 |
| | | | | 712/241 |
| 2014/0237460 A1 | 8/2014 | Schmidt | | |

* cited by examiner

600

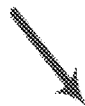

SCALAR VS. VECTOR MATHEMATICAL INSTRUCTIONS

| Scalar | Vector | Description |
|---|---|---|
| ADDSS | ADDPS | Adds operands |
| SUBSS | SUBPS | Subtracts operands |
| MULSS | MULPS | Multiplies operands |
| DIVSS | DIVPS | Divides operands |
| SQRTSS | SQRTPS | Square root of operands |
| MAXSS | MAXPS | Maximum of operands |
| MINSS | MINPS | Minimum of operands |
| RCPSS | RCPPS | Reciprocal of operands |
| RSQRTSS | RSQRTPS | Reciprocal of square root of operands |

SYSTEM AND METHOD FOR CONTEXTUAL VECTORIZATION OF INSTRUCTIONS AT RUNTIME

TECHNICAL FIELD

Embodiments described herein generally relate to processors. In particular, embodiments described generally relate to processors configured to contextually optimize instructions at runtime.

BACKGROUND INFORMATION

Parallel processing is generally faster than scalar execution of one data point at a time. Single Instruction Multiple Data (SIMD) computers with multiple processing elements that perform the same operation on multiple data points achieve performance gains by taking advantage of parallelism and simultaneous use of multiple parallel execution cores.

SIMD processors can take advantage of parallelism in performing mathematical operations and in moving data. SIMD processors can load or store multiple data items simultaneously, resulting in a performance gain compared to the slower, scalar processors that load or store one datum at a time. When executing computer programs on a processor with parallel resources, utilizing SIMD instructions offers better performance than utilizing scalar instructions.

Programming using a SIMD Instruction Set Architecture (ISA), however, can be challenging. SIMD ISA's, for example, are generally processor-specific. Programs that use SIMD instructions may need to be rewritten and customized to suit a new processor generation. The work required to adapt scalar instructions to a new instruction set architecture, including rewriting the code, documenting the code; enabling compilers to emit the code, training users to use the code, and to debug and collect traces of code execution may need to be partly or wholly repeated for reuse with each new generation of instruction set architecture (e.g. MMX, SSE, SSE2, SSE3, SSE4, AVX, AVX2, AVX 3.1, and AVX 3.2). What is needed, therefore, is a way to allow programmers to take advantage of SIMD Instruction Set Architectures while avoiding the challenges inherent in conventional solutions.

Furthermore, conventional solutions are limited because they optimize the code statically, ahead of time, rather than dynamically, during execution. Compilers attempt to optimize execution of certain code sequences, but they operate in a static environment, without knowledge of the state of the machine or of the registers. Even SIMD code that was conventionally coded by hand is not able to optimize the code according to the run-time state of the machine and of the registers. What is needed, therefore, is a way to optimize instructions at run-time, with knowledge of the state of the registers and their contents.

BRIEF DESCRIPTION OF THE DRAWINGS

FIG. 6 illustrates a portion of a lookup table listing vector instruction substitutes for scalar instructions according to one embodiment.

DETAILED DESCRIPTION

Figure 1:
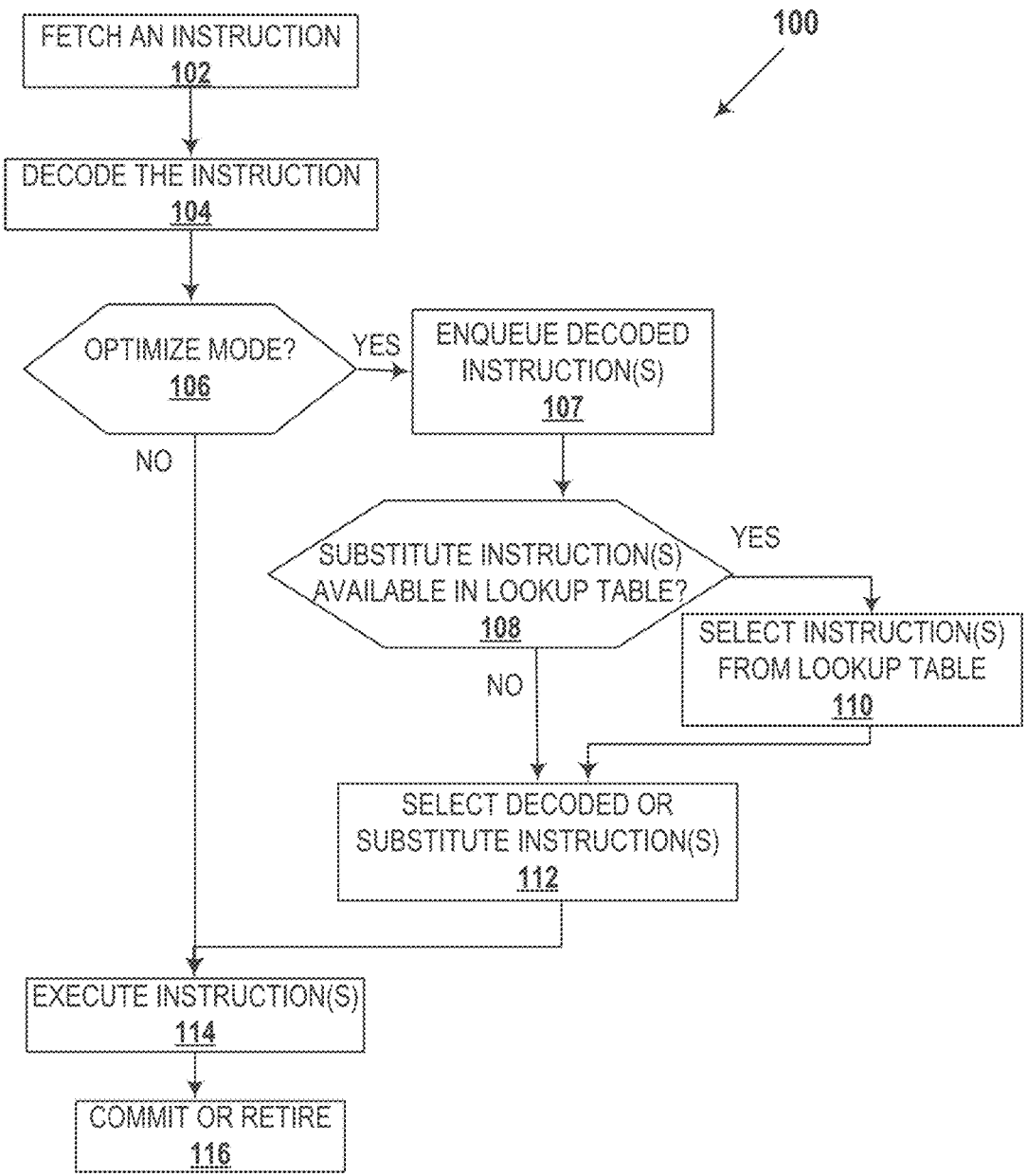
FIG. 1 is a block flow diagram illustrating a procedure for a processor to contextually optimize instructions at runtime according to one embodiment.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution. A processor (e.g., having one or more cores to decode and/or execute instructions) may operate on data, for example, in performing arithmetic, logic, data movement, or other functions.

Contextual Optimization at Runtime

According to the disclosure, a processor contextually optimizes instructions at runtime. Specifically, the processor optimizes a sequence of sub-optimal instructions dynamically at runtime. Sub-optimal instructions as used herein refer to instructions that make less-than-full use of the available resources of a processor, or which can be optimized to take advantage of a processor's instruction set architecture. In one embodiment, sequences of sub-optimal instructions are stored in instruction storage, and are surrounded by start- and end-delimiting instructions. Generally, for purpose of disclosure, the sequence of sub-optimal code surrounded by start-of-sequence and end-of-sequence instructions is referred to herein as Vectorbeam code. The claims herein are not limited by the name Vectorbeam. In alternate embodiments, the code can be referenced by different names. The Vectorbeam instructions are not limited in their choice of particular opcodes or mnemonics.

According to a disclosed embodiment, a processor is configured to detect a Vectorbeam code sequence of sub-optimal instructions, to buffer the sequence, and to access a lookup table to identify one or more instructions to substitute for and optimize one or more of the sub-optimal instructions of the Vectorbeam code sequence.

Delimiters: Start-of-Sequence and End-of-Sequence

In one embodiment, the start-of-sequence instruction and end-of-sequence instruction can be chosen to provide the processor with a hint on how to optimize the code sequence. In one embodiment, a processor can surmise that the sequence of sub-optimal instructions is meant to be an iterative loop because the sequence of sub-optimal instructions is preceded by a start-of-sequence delimiting instruction, "foreach," and is followed by an end-of-sequence delimiting instruction, "next." Similarly, in alternate embodiments, the start-of-sequence instruction may hint that the sequence of sub-optimal instructions is iterative by using delimiting instructions "foreach," or "do until," or "repeat until," or "do while." The end-of-sequence instruction may be similarly named so as to suggest its function. (e.g. "end," "exit," "stop," "continue," "return"). The start-of-sequence and end-of-sequence instructions may also have predetermined values that are not human readable, or are numeric, or have been selected automatically or randomly without human involvement.

Sequence of Sub-Optimal Instructions

A sequence of sub-optimal instructions, as used herein, refers to computer instructions that take less-than-full advantage of the parallel resources available in a processor on which those instructions are meant to be executed.

For example, the sequence of sub-optimal instructions may be an iterative, scalar loop, which, as written, uses fewer parallel resources than are available in the processor.

As a further example, the sequence of sub-optimal instructions may have been written to use 64-bit registers, but the processor on which those instructions are to be executed has 128-bit registers available.

As a further example, the sequence of sub-optimal instructions relate to multimedia operations, such as dimming the brightness of a screen of pixels. In such an example, scalar mathematical operations can be replaced with wide vector instructions.

Metadata

According to the disclosure, the start-of-sequence instruction may include operands that provide metadata to a processor that will implement the Vectorbeam code sequence. In one embodiment, the metadata gives the processor a hint as to how to optimize the code. In one embodiment, the sequence of sub-optimal instructions is preceded by a start-of-sequence instruction, "for each rax, 0, 64, 1" The metadata, "rax, 0, 64, and 1," provide the processor with a hint that the sub-optimal code should be looped using register rax as a loop index, varying rax 64 times, starting at 0, with a stride of 1 for each iteration.

Description of Illustrative Embodiments

FIG. 1 is a block flow diagram illustrating a procedure for a processor to contextually optimize instructions at runtime according to one embodiment. Specifically, a processor that is configured to execute a procedure to contextually optimize instructions at runtime according to block flow diagram 100 fetches an instruction at 102, decodes the instruction at 104, and tests whether it is in optimize mode at 106. In one embodiment, the instruction to be fetched is stored in an instruction buffer. In alternate embodiments, the instruction may be stored in an instruction register, a general register, a program stack, or a memory, including static and dynamic random access memories. A processor performing the procedure of flow diagram 100 decodes the fetched instruction (e.g., macro-instruction) at 104 to generate as an output one or more micro-operations, micro-code entry points, micro-instructions, other instructions, or other control signals.

According to the disclosure, a Vectorbeam code sequence consisting of a sequence of sub-optimal instructions is stored in the memory, preceded by a start-of-sequence instruction and followed by an end-of-sequence instruction. In one embodiment, the start-of-sequence instruction may be coded in human-readable assembly code, and have mnemonics defined in a way so as to suggest how the sub-optimal instructions should be optimized. For example, the start-of-sequence instruction may be "for each," or "do until," or "repeat until," or "do while," to name a few examples. The end-of-sequence instruction may be similarly named so as to suggest its function. (e.g. "end," "exit," "stop," "continue," "return," "abort," "undo," or "commit"). The start-of-sequence and end-of-sequence instructions may also have predetermined values that are not human readable, or are numeric, or have been selected automatically or randomly without human involvement.

The Vectorbeam code's sub-optimal code sequences, in one embodiment are written to mimic scalar mnemonics and appear to have a scalar and/or serial flow of execution, making them easy to understand and to debug. Delimiting the sub-optimal code sequences with easy-to-understand delimiters may enhance the readability of the code, and may also suggest to the processor how to optimize the code at runtime.

If the processor determines at 106 that it is not running in optimize mode, it dispatches the decoded instruction to be executed at 114, and commits or retires the instruction at 116.

Entering the optimize mode in one embodiment occurs during run-time when the instruction decoded at 104 is a start-of-sequence instruction, as described above. In another embodiment, the processor enters the optimize mode at power-on, or after reset. In another embodiment, the processor enters optimize mode implicitly after fetching a particular sequence of instructions at 102, decoding them at 104, and detecting one or more sub-optimal instructions, such as scalar instructions, or instructions from an older instruction set architecture. In an alternate embodiment, the processor enters optimize mode implicitly during run-time in response to a predefined run-time event.

Exiting the optimize mode in one embodiment occurs during run-time when the instruction decoded at 104 is an end-of-sequence instruction, as described above. In an alternate embodiment, the processor exits the optimize mode implicitly after occurrence of a condition, such as failing to identify a substitute instruction for a time. In an alternate embodiment, the processor remains in the optimize mode indefinitely.

If the processor determines at 106 that it is already in optimize mode, or if the processor detects a start-of-sequence instruction, it enqueues the decoded instruction at 107 into an instruction buffer. The instruction buffer in one embodiment is a series of general purpose registers. In other embodiments, the instruction buffer may utilize instruction registers, scalar registers, shift registers, a stack memory, a static or dynamic RAM memory, or a cache memory.

In operation and during run-time, the processor compares the instructions in the instruction buffer to a lookup table at 108 to determine whether suitable substitute instructions are available, including substitute instructions that would yield better performance. In evaluating at 108 whether suitable substitute instructions are available, the processor in one embodiment is guided by the metadata included with the start-of-sequence delimiter. In evaluating at 108 whether suitable substitute instructions are available, the processor in one embodiment is guided by the state and contents of the register file, described further below with respect to FIG. 7.

Examples of the disclosed processor implementing Vectorbeam code and being guided by metadata are discussed below with reference to Table 1 and Table 2. In one embodiment, the sub-optimal instructions of the Vectorbeam code comprise scalar instructions, and the substitute instructions comprise vector instructions or SIMD instructions. In one embodiment, the sub-optimal instructions of the Vectorbeam code include instructions from an older generation processor's instruction set architecture, and the substitute instructions are selected from the instruction set of a more recent processor. In one embodiment, the sequence of sub-optimal instructions of the Vectorbeam code consists of an iterative loop of instructions, and the substitute instructions complete the operation with fewer loops, or with the use of vector instructions. In another embodiment, the sequence of sub-optimal instructions in the instruction buffer consists of a conditional loop, and the substitute instructions complete the operation with fewer loops, or with the use of vector instructions. If the processor determines at 108 that a substitute instruction that would yield better performance is available, it selects one or more substitute instructions at 110.

At 112, the processor selects the decoded instruction for execution if no substitute instructions were available at 108, or selects the one or more substitute instructions that were selected at 110. In one embodiment, the processor maintains a sequence of instructions in the instruction buffer, and considers multiple instructions when evaluating potential substitutes at 108. In another embodiment, the processor limits the number of instructions stored in the instruction buffer, and, if the number of instructions exceeds that limit, the processor removes one or more instructions from the instruction buffer and dispatches them to be executed at 114.

At 114, the processor executes the decoded instruction or the one or more substitute instructions. After execution, the processor retires or commits the instruction at 116, ensuring that execution results are written to or have been written to their destinations, and freeing up or releasing resources for later use.

Figure 2:
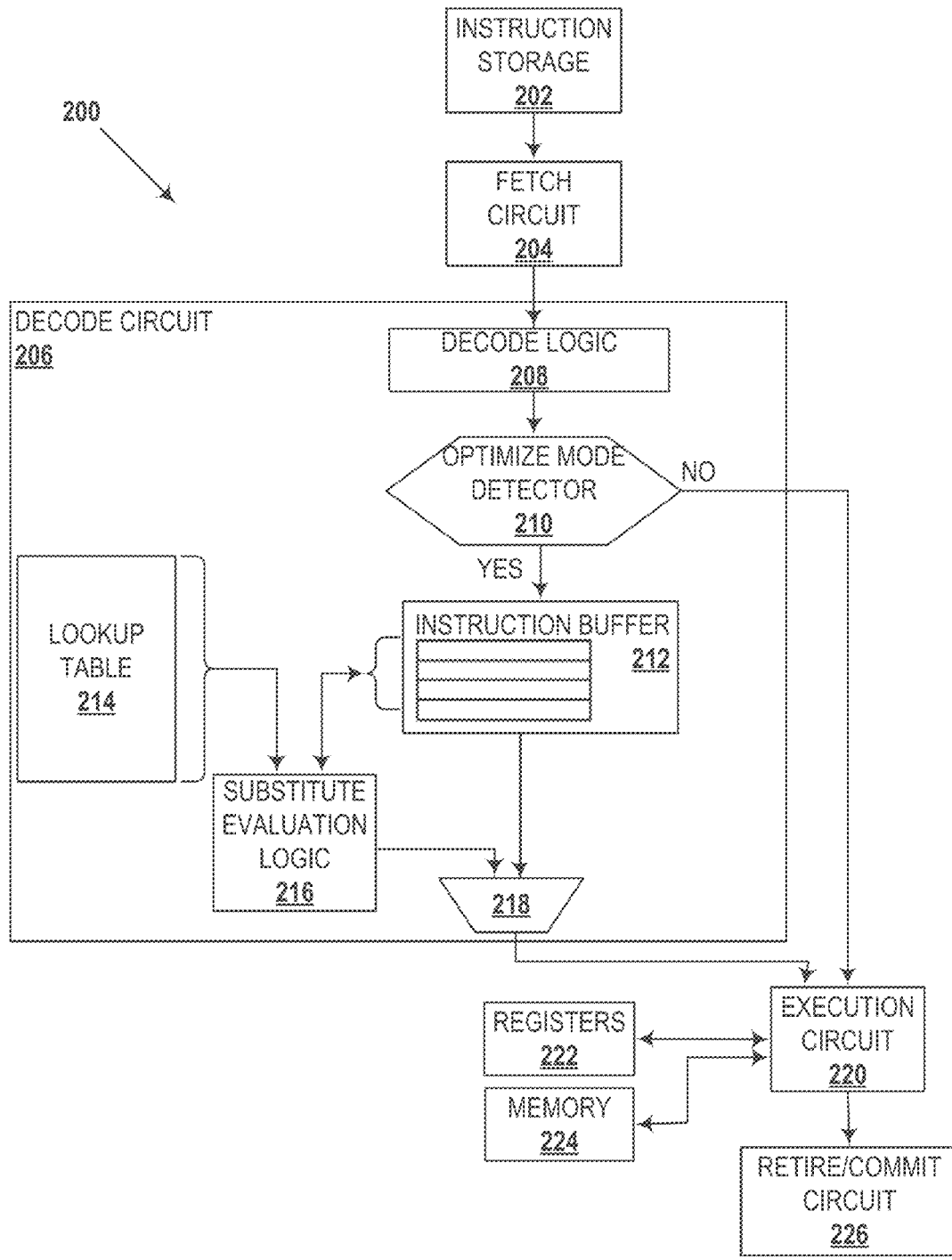
FIG. 2 is a block diagram illustrating processing components used by a processor to contextually optimize instructions at runtime according to one embodiment.

FIG. 2 is a block diagram illustrating processing components used by a processor to contextually optimize Vectorbeam code instructions at runtime according to one embodiment. Specifically, block diagram 200 includes instruction storage 202, fetch circuit 204, decode circuit 206, execution circuit 220, and retire/commit circuit 226. Decode circuit 206 includes decode logic 208, optimize mode detector 210, instruction buffer 212, lookup table 214, substitute evaluation logic 216, and instruction selector 218. Block diagram 200 further includes execution circuit 220, registers 222, memory 224, and retire/commit circuit 226.

In operation, the processor utilizes fetch circuit 204 during run-time to fetch an instruction from instruction storage 202. In one embodiment, instruction storage 202 is a register file. In alternate embodiments, instruction storage 202 may be an instruction buffer, an instruction register, a general register, a program stack, or a static or dynamic random access memory.

The processor passes the fetched instruction to decode circuit 206, which decodes the fetched instruction with decode logic 208. The instruction, including its opcode and optional operands, is described below with reference to FIG. 3. The processor detects whether it is in optimize mode with optimize mode detector 210. If the processor is not in optimize mode, the processor dispatches the decoded instruction to execution circuit 220.

But, if optimize mode detector 210 detects that the processor is in optimize mode or sets the processor in optimize mode, the decoded instruction is queued in instruction buffer 212. As shown, instruction buffer 212 has four entries, but the number of entries is variable: it could be fewer than four, it could be greater than four, or it could be adjusted dynamically, as would be understood by those of skill. During run-time, the processor uses substitute evaluation logic 216 to evaluate the decoded instructions in instruction buffer 212.

Specifically, substitute evaluation logic 216 accesses lookup table 214 during run-time to determine whether any substitute instructions are available. The lookup table in one embodiment compares mnemonics of sub-optimal Vectorbeam instructions in the instruction buffer to a listing of substitute instructions. In one embodiment, the substitute instructions are vector instructions. In another embodiment, the substitute instructions are SIMD instructions. In another embodiment, the substitute instructions are from a newer instruction set architecture than the sub-optimal instructions. In evaluating substitutes, substitute evaluation logic 216 in one embodiment is guided by metadata provided with a start-of-sequence instructions. In evaluating substitutes, substitute evaluation logic 216 in one embodiment evaluates the run-time state of the processor registers. For example, if multiple registers are used in determining memory addresses, and if those memory addresses fall in the same cache line, substitute evaluation logic 216 substitutes a vector memory access for scalar memory accesses associated with those memory addresses.

In one embodiment, if substitute evaluation logic 216 determines that a substitute instruction is available, the substitute instruction is passed to dispatch selector 218 to be dispatched for execution. In alternate embodiments, the substitute instruction is written into instruction buffer 212, adding to or replacing instructions therein. As shown, decode circuit 206 uses dispatch selector 218 to select instructions to dispatch either from instruction buffer 212 or from substitute evaluation logic 216.

Execution circuit 220 in one embodiment is a vector processor. In alternate embodiments, execution circuit 220 may include multiple cores, and parallel hardware. Execution circuit 220 in one embodiment utilizes registers 222 and memory 224 to store intermediate results and to otherwise support execution. After execution, retire/commit circuit 226 ensures that execution results are written to or have been written to their destinations, and frees up or releases resources for later use.

Figure 3:
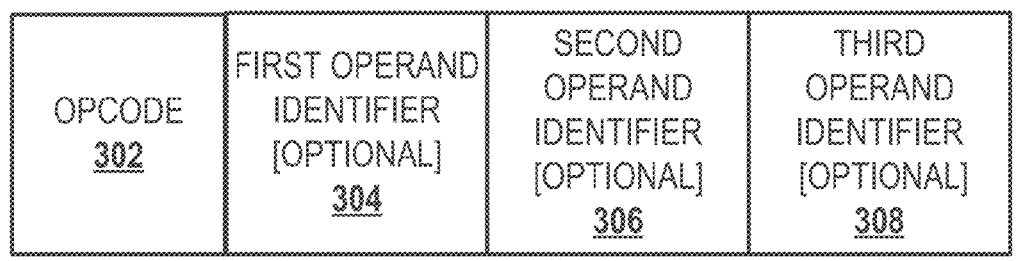
FIG. 3 illustrates an instruction and its various fields according to one embodiment.

FIG. 3 illustrates an instruction and its various fields according to an embodiment. Specifically, instruction 300 includes opcode 302 and optional first, second, and third operand identifiers, 304, 306, and 308, respectively. Opcode 302 identifies the instruction and/or the operation to be performed, as well as the type of operands (e.g., "start-of-sequence" or "end-of-sequence"). First, second, and third operand identifiers, 304, 306, and 308, are optional. In one embodiment, opcode 302 is a "start-of-sequence" instruction and first, second, and third operand identifiers 304, 306, and 308 represent metadata that describe the sub-optimal instructions that follow, providing a hint or a suggestion to the processor as to how to optimize the sub-optimal instructions. In an alternate embodiment, opcode 302 is a "start-of-sequence" instruction identifying an iterative sequence of sub-optimal instructions that follow, and first, second, and third operand identifiers 304, 306, and 308 suggest a number of loop iterations, a register to vary on each iteration, and a stride by which to increment the variable on each iteration. In an alternate embodiment, opcode 302 corresponds to a "start-of-sequence" instruction, and one or more of the first, second, and third operand identifiers 304, 306, and 308 are not used. In an alternate embodiment, opcode 302 corresponds to an "end-of-sequence" instructions, and first, second, and third operand identifiers 304, 306, and 308 are not used.

Table 1 illustrates an exemplary sequence of sub-optimal instructions optimized according to one embodiment. Specifically, the side-by-side-by-side code comparison of Table 1 illustrates three versions of instructions: scalar code, AVX code, and Vectorbeam code, to implement the below loop, labeled as Code 1:

for (int $i=0;i<64; i++$){out$p[i]$=in$p1[i]$+in$p2[i]$;}     Code 1.

here "next." As coded, the "foreach" opcode in the start-of-sequence instruction indicates to a processor implementing flow 100 (FIG. 1) that the sub-optimal code to follow is meant to be iterative code. As coded, operands "rax" "0," "64," and "1" provide metadata suggesting to the processor implementing flow 100 (FIG. 1) to loop the sub-optimal code using register rax as a loop index, varying rax from 0 to 63, with a stride of 1 for each iteration. In other words, the start-of-sequence instruction suggests to the processor implementing flow 100 (FIG. 1) to execute the sub-optimal code 64 times, varying rax by 1 each time. The author of the original scalar code can prepare the Vectorbeam code sequence with essentially the same opcodes and essentially the same formats, and leave it to the processor to optimize the code. The processor will optimize the Vectorbeam code to take advantage of its particular hardware capabilities and instruction set architecture. In this way, the code sequence to implement Code 1 may be ported to new generations of

TABLE 1

| Scalar Code | |
|---|---|
| ..LOOP | Label loop |
| movss (%rsp,%rax,4), %xmm0 | Move 64 bits from (memory) to xmm0 |
| movss 256(%rsp,%rax,4), %xmm1 | Move 64 bits from (memory + 256) to xmm1 |
| addss %xmm1, %xmm0 | xmm0 += xmm1 |
| movss %xmm0, 512(%rsp,%rax,4) | Move 64 bits from xmm0 to (memory + 512) |
| incq %rax | Increment rax |
| cmpq $64, %rax | compare rax to 64 |
| jl ..LOOP | Loop 64 Times |
| AVX Code | |
| ..LOOP | Label loop |
| vmovups (%rsp,%rax,4), %ymm0 | Vector move 256 bits from(memory) to ymm0 |
| vmovups 256(%rsp, %rax,4), %ymm1 | Vector move 256 bits from (memory + 256) to ymm1 |
| vaddps %ymm1, %ymm0 | Vector add ymm0 += ymm1 |
| vmovups %ymm0,512(%rsp,%rax,4) | Vector move 256 bits from ymm0 to (memory + 512) |
| addq 8, %rax | Add 8 to rax |
| cmpq $64, %rax | Compare rax to 64 |
| jl ..LOOP | Loop 8 times |
| Vectorbeam Code | |
| foreach rax, 0, 64, 1 | Start-of-sequence: loop on rax from 0 to 63 by 1 |
| movss (%rsp,%rax,4), %xmm0 | Move 64 bits from (memory) to xmm0 |
| movss 256(%rsp,%rax,4), %xmm1 | Move 64 bits from (memory + 512) to xmm1 |
| addss %xmm1, %xmm0 | xmm0 += xmm1 |
| movss %xmm0, 512(%rsp,%rax,4) | Move 64 bits from xmm0 to (memory + 512) |
| next | |

As shown in Table 1, scalar code includes a loop to be executed 64 times, incrementing register rax by one each time. Scalar code is sub-optimal because it may fail to exercise all parallel resources of the processor during its 64 loop iterations.

AVX code differs from scalar code in several respects. The AVX registers, ymm0 and ymm1 have different names and different sizes. The AVX opcodes have different names. Iteration through the data by 8 instead of by 1 is particular to the generation of processors associated with AVX. Generally, the work done to invent scalar instructions, such as the scalar instructions in Table 1, to document them, to enable compilers to emit them, to train users to use them, and to debug and collect traces of their execution may need to be partly or wholly repeated for reuse with each new generation of instruction set architecture (e.g. MMX, SSE, SSE2, SSE3, SSE4, AVX, AVX2, AVX 3.1, and AVX 3.2).

According to the disclosure, however, essentially the same scalar instructions with essentially the same format are used in Vectorbeam code. Specifically, the Vectorbeam code body is surrounded by a start-of-sequence instruction, here "foreach rax, 0, 64, 1," and an end-of-sequence instruction, processors and instruction set architectures without the effort of rewriting, redocumenting, reenabling, retesting, retraining, redebugging, and republishing the code. Developers may also spend less time learning new opcodes and new register files and other details associated with a new instruction set architecture when a new processor becomes available.

Figure 4:
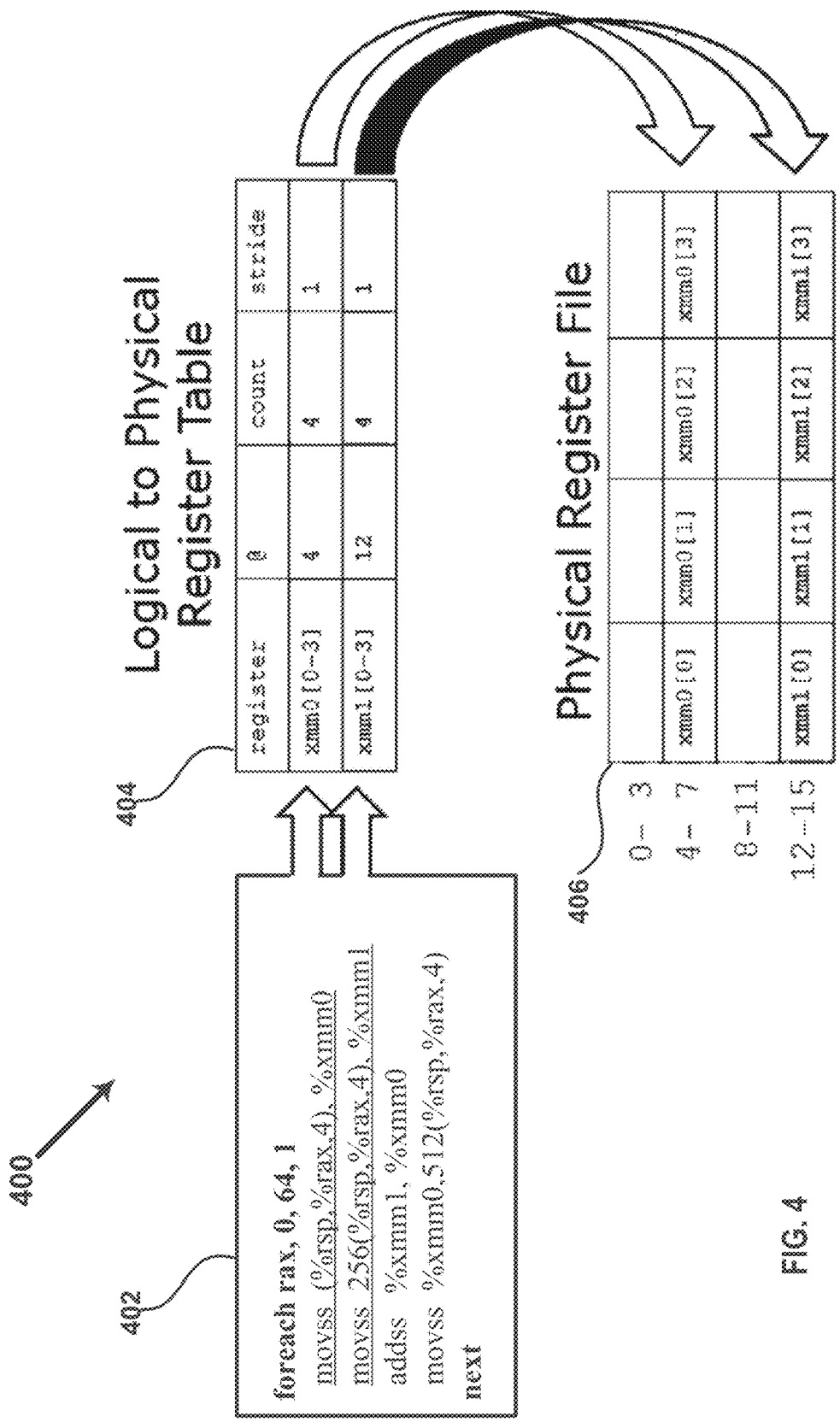
FIG. 4 illustrates an exemplary register allotment by a processor optimizing Vectorbeam code of Table 2 according to an embodiment.

FIG. 4 illustrates an exemplary register renaming by a processor optimizing Vectorbeam code of Table 1 according to an embodiment. Specifically, Vectorbeam code in this embodiment is to be run by a 128-bit processor (e.g. SSE) that has a default strategy to expand Vectorbeam contexts by 4. Hence, the first time through the processor must perform code for rax having the values {0, 1, 2, 3}. When the processor reaches the Vectorbeam instruction, movss (% rsp, % rax, 4), % xmm0, it must perform four loads:

$xmm0[0]=(rsp+0*4)$;

$xmm0[1]=(rsp+1*4)$;

$xmm0[2]=(rsp+2*4)$;

$xmm0[3]=(rsp+3*4)$;

Although Vectorbeam code of Table 1 refers to architectural registers xmm0 and xmm1, the processor executing Vectorbeam code 402 of FIG. 4 renames architectural registers to physical registers. (As is known to those of skill, the processor executing the code may have a large number of physical registers to serve as the architectural registers referenced in various program threads, threads that may be running simultaneously or out-of-order.) As shown, the processor accesses logical to physical register table 404 to determining how to map the architectural registers to physical registers. According to table 406, the processor assigns xmm0 and xmm1 to physical register file locations 4-7 and 12-15.

Figure 5:
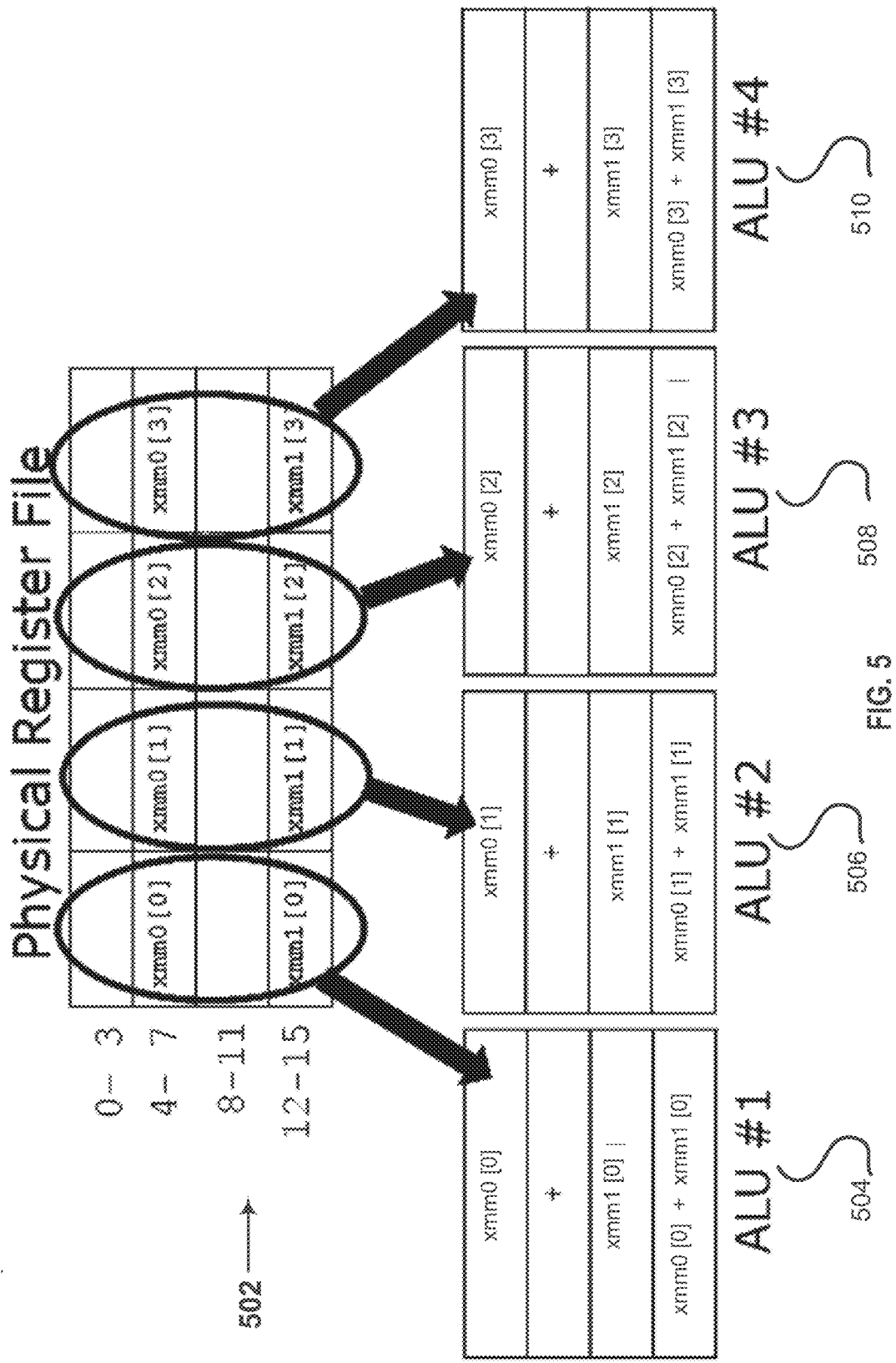
FIG. 5 illustrates an exemplary allotment of multiple computational resources used to process the allotted registers of FIG. 4 in parallel according to one embodiment.

FIG. 5 illustrates an exemplary allotment of multiple computational resources used to process the allotted registers of FIG. 4 in parallel according to one embodiment. The 128-bit SSE processor here applies its knowledge of its available hardware resources to optimize the code and the register renaming. As shown, the processor according to the disclosure renames the architectural xmm registers to the physical register file 502. The chosen register allotment in this embodiment allows four ALU's at a time to perform the addition in parallel, as indicated by 504, 506, 508, and 510 of FIG. 5.

Table 2 illustrate an exemplary sequence of Vectorbeam sub-optimal instructions being optimized according to one embodiment. Specifically, the side-by-side-by-side-by-side code comparison of Table 2 illustrates four versions of instructions: scalar code, SSE code, AVX3 code, and Vectorbeam code, to implement the conditional loop of Code 2, below:

for (int $i=0;i<PTS;i++$){if (cond[$i$]){out$p$[$i$]=in$p$1[$i$]+ in$p$2[$i$];}}  Code 2.

TABLE 2

| Scalar Code | SSE Code |
|---|---|
| ..LOOP<br>cmpl $0, 768(%rsp,%rax,4)<br>je    ..FALSE<br>movss (%rsp,%rax,4), %xmm0<br>addss 256(%rsp,%rax,4), %xmm0<br>movss %xmm0, 512(%rsp,%rax,4)<br>..FALSE<br>incq %rax<br>cmpq $64, %rax<br>jl    ..LOOP | ..LOOP<br>movups (%rsp,%rax,4), %xmm3<br>movdqu 768(%rsp,%rax,4), %xmm0<br>pcmpe4 %xmm1, %xmm0<br>addps 256(%rsp,%rax,4), %xmm3<br>movups 512(%rsp,%rax,4), %xmm4<br>pxor   %xmm2, %xmm0<br>blendvps %xmm0, %xmm3, %xmm4<br>movups %xmm4, 512(%rsp,%rax,4)<br>addq  $4, %rax<br>cmpq  $64, %rax<br>jb    ..LOOP |
| AVX3 Code | Vectorbeam code |
| ..LOOP<br>vmovups (%rsp,%rax), %zmm1<br>addb  $16, %dl<br>vpcmpd $4, 512(%rsp,%rax), %zmm0, %k1<br>vaddps 256(%rsp,%rax), %zmm1, %zmm2<br>vmovups %zmm2, 1624(%rsp, %rax){%k1}<br>addq $64, %rax<br>cmpb $64, %dl<br>jb    ..LOOP | foreach rax, 0, 64, 1<br>cmpl   $0, 768(%rsp,%rax,4)<br>je     ..FALSE<br>movss (%rsp,%rax,4), %xmm0<br>addss 256(%rsp,%rax,4), %xmm0<br>movss %xmm0, 512(%rsp,%rax,4)<br>..FALSE<br>Next |

As shown, scalar code, like scalar code shown in Table 1 and Table 2, is sub-optimal because it requires 64 loops. If scalar code or were to run on a modern vector processor, it would use less parallel hardware resources than are available.

As with AVX code (Table 1) a programmer migrating scalar code to SSE code would need to learn new opcodes, new register sets, and SSE code does not provide a jump bypass. Generally, the work done to invent the scalar instructions, document them, enable compilers to emit them, train users to use them, and to debug and collect traces for the code, which may need to be partly or wholly repeated each generation of instruction set architecture (e.g. MMX, SSE, SSE2, SSE3, SSE4, AVX, AVX2, AVX 3.1, and AVX 3.2).

SSE code, moreover, has a few shortcomings. For one, since the SSE code has no jump bypass, it performs the math for all the lanes regardless, and then uses a BLEND instruction to appropriately merge the untouched non-conditional values with those written in the conditional block. Performance suffers (a BLEND is ~1.5× slower than a normal store)—more registers are needed (5 vs. 2). As with AVX code (Table 1), SSE code generation requires a sophisticated compiler.

AVX3 code, like AVX code (Table 1), differs from scalar code in several respects. The AVX3 registers, ymm0 . . . n have different names and different sizes. AVX3 opcodes have different names. AVX3 uses 'k' registers which are set as the result of a compare and then used in combination with stores/loads. Like SSE code, AVX3 code does not have a branch; the processor executes all opcodes under all conditions. Generally, then, the work done to invent the scalar instructions, document them, enable compilers to emit them, train users to use them, and to debug and collect traces for the code may need to be partly or wholly repeated for each generation of instruction set architecture (e.g. MMX, SSE, SSE2, SSE3, SSE4, AVX, AVX2, AVX 3.1, and AVX 3.2).

According to the disclosure, however, essentially the same scalar instructions as (Table 1) can be used with essentially the same format, in Vectorbeam code. Specifically, the Vectorbeam code starts with a start-of-sequence instruction, here "foreach rax, 0, 64, 1," and end-of-sequence instruction, here "next." As coded, the "foreach" opcode indicates to a processor implementing flow 100 (FIG. 1) that the sub-optimal Vectorbeam code to follow is iterative code. As coded, operands "rax" "0," "64," and "1" provide metadata suggesting to the processor implementing flow 100 (FIG. 1) to loop the sub-optimal Vectorbeam code using register rax as a loop index, varying rax from 0 to 63, with a stride of 1 for each iteration. In other words, the processor implementing flow 100 (FIG. 1) will be instructed to execute the sub-optimal code 64 times, varying rax by 1 each time. In this way, the code sequence to implement Code 1 may be ported to new generations of instruction set architectures without the effort of rewriting, retesting, and republishing the code. Developers may also spend less time learning new opcodes and new register files and other details associated with a new instruction set architecture.

Moreover, according to the disclosure, the CPU architect, who has knowledge of the particular resources, capabilities, and instruction set architecture associated with a particular CPU can choose how to implement the functions described in the sequence of sub-optimal Vectorbeam instructions. Furthermore, the opcode 302 (FIG. 3) and the metadata 304, 306, and 308 (FIG. 3) can provide hints to the processor in choosing what instructions to substitute for the sequence of sub-optimal Vectorbeam instructions. For example, the start-of-sequence instruction can let the processor know that a number of memory loads or stores utilize the same offset. Or, the start-of-sequence instruction can provide a hint that a number of memory loads or stores are to the same cache line. Or, the start-of-sequence instruction can provide a hint that a number of mathematical operations use the same operand, as might be the case in a multimedia or graphics code routine that adjusts pixels uniformly, such as by increasing brightness.

FIG. 6 illustrates a portion of a lookup table listing vector instruction substitutes for scalar instructions according to one embodiment. Specifically, table 600 lists scalar instructions and their corresponding vector equivalents for performing mathematical operations: addition, subtraction, multiplication, division, square root, maximum, minimum, reciprocal, and reciprocal of square root. Referring to side-by-side table 600, in one embodiment, the sequence of sub-optimal Vectorbeam instructions stored in instruction buffer 212 (FIG. 2) includes a scalar addition, ADDSS, and substitute evaluation logic 216 (FIG. 2) substitutes a vector addition, ADDPS, for one or more of the sub-optimal Vectorbeam instructions.

Figure 7:
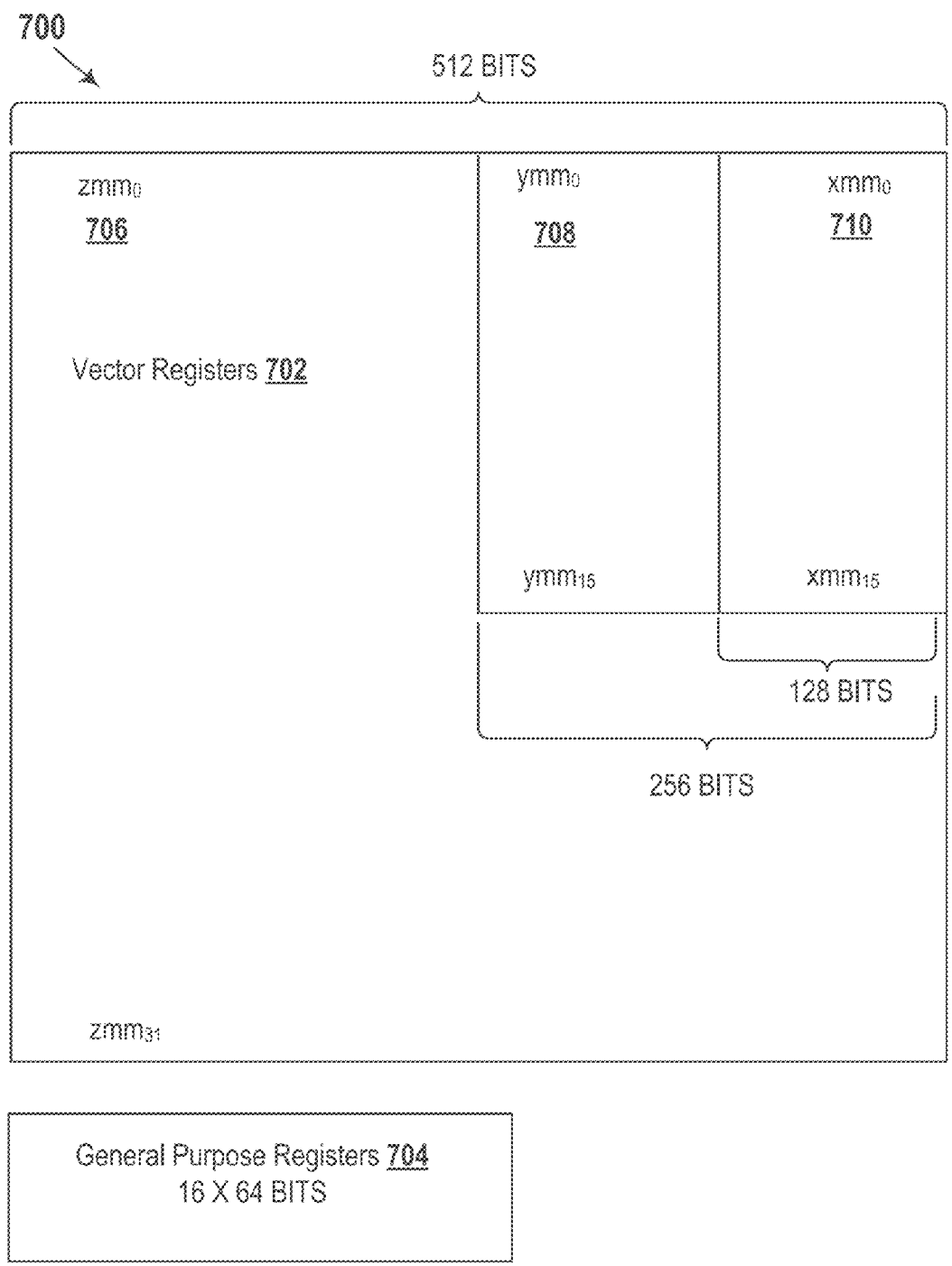
FIG. 7 illustrates a vector processor register file according to one embodiment.

FIG. 7 illustrates a vector processor register file according to one embodiment. Specifically, register file 700 includes vector registers 702 and general purpose registers 704. As shown, vector registers 702 include 32 zmm registers 706, each 512 bits wide, 16 ymm registers 708, each 256 bits wide, and 16 xmm registers 710, each 128 bits wide. As part of evaluating substitutes for sub-optimal Vectorbeam instructions in instruction buffer 212 (FIG. 2), substitute evaluation logic 216 (FIG. 2) in one embodiment assigns the results of 8 32-bit scalar operations to a 256-bit ymm register.

In an alternate embodiment, a Vectorbeam sequence of sub-optimal instructions is replaced with instructions from a newer instruction set architecture. In one embodiment, a sequence of sub-optimal SSE instructions that utilize 128-bit XMM registers 710 is replaced by a sequence of AVX, running instructions that utilize 256-bit YMM registers 708 and achieve better performance without requiring the sub-optimal code to be rewritten by its author. In another embodiment, a sequence of sub-optimal AVX instructions that utilize YMM registers 708 are replaced by a sequence of AVX-512 instructions that utilize ZMM registers 706 and achieve better performance without requiring the sub-optimal code to be rewritten by its author.

In an alternate embodiment, opcode 302 (FIG. 3) could identify the particular instruction set architecture associated with the sub-optimal instructions stored in instruction buffer 212 (FIG. 2). Substitute evaluation logic 216 (FIG. 2) could then substitute optimal instructions associated with the processor's instruction set architecture for the sub-optimal instructions.

In one embodiment, the sub-optimal instructions and the substitute instructions are both vector instructions, but the substitute instructions are from a newer generation and use wider registers.

What is claimed is:

1. A processor to optimize instructions at run-time, comprising:
   fetch and decode circuitry to fetch and decode the instructions;
   an instruction buffer comprising at least four entries to buffer decoded instructions;
   a substitute evaluation circuit to operate during run-time to:
      determine whether an operating mode is an optimize mode;
      identify, among the buffered instructions, a sequence of sub-optimal instructions comprising three or more instructions and delimited by a start-of-sequence instruction;
      access processor contextual data, including contents of a register file;
      access a lookup table of substitute instructions; and
      select, for each of the buffered instructions, between the buffered instruction and one or more substitute instructions based on the operating mode, the sequence of sub-optimal instructions, the processor contextual data, and the contents of the lookup table; and
   an execution circuit to execute the each of the selected instructions.

2. The processor of claim 1, wherein the sequence of sub-optimal instructions are sub-optimal because they use an older generation of an instruction set architecture (ISA) than the instructions in the lookup table.

3. The processor of claim 1, wherein the sequence of sub-optimal instructions are sub-optimal because they include vector instructions written to use smaller vector registers than are available on the processor.

4. The processor of claim 1, wherein the sequence of sub-optimal instructions include scalar multimedia operations and the substitute instructions include vector instructions.

5. The processor of claim 1, wherein the sequence of sub-optimal instructions are sub-optimal because the processor contextual data indicates that the sub-optimal instructions are using more than one memory access to access a same cache line.

6. The processor of claim 1, wherein the buffered instructions comprise scalar instructions and a sequence of one or more optimized instructions comprises vector instructions.

7. The processor of claim 1, wherein the buffered instructions comprise scalar instructions and a sequence of one or more optimized instructions comprises SIMD instructions.

8. The processor of claim 1, further comprising an optimize mode detector circuit to monitor the instruction buffer at runtime, set the optimize mode to TRUE when the start-of-sequence instruction is detected, and set the optimize mode to FALSE when an end-of-sequence instruction is detected.

9. The processor of claim 8, wherein the start-of-sequence instruction includes metadata to provide hints on whether and how to perform substituting.

10. A method of optimizing instructions by a processor at run-time, comprising:
   determining, by a substitute evaluation circuit, that the processor is running in an optimize mode;
   fetching and decoding the instructions using fetch circuitry and decode circuitry;
   buffering decoded instructions in an instruction buffer comprising at least four entries;
   identifying, by the substitute evaluation circuit, a sequence of sub-optimal instructions comprising three or more instructions delimited by a start-of-sequence instruction;
   accessing, by the substitute evaluation circuit, processor contextual data, including contents of a register file;
   accessing by the substitute evaluation circuit, a lookup table of substitute instructions;
   for each buffered instruction, selecting, based on the sequence of sub-optimal instructions, the processor contextual data, and the contents of the lookup table, between the buffered instruction and substitute one or more substitute instructions; and
   executing, by an execution circuit, the selected instructions.

11. The method of claim 10, wherein the sequence of sub-optimal instructions are sub-optimal because they use an older generation of an instruction set architecture (ISA) than the instructions in the lookup table.

12. The method of claim 10, wherein the sequence of sub-optimal instructions are sub-optimal because they include vector instructions written to use smaller vector registers than are available on a processor.

13. The method of claim 10, wherein the sequence of sub-optimal instructions include scalar multimedia operations and the substitute instructions include vector instructions.

14. The method of claim 10, wherein the sequence of sub-optimal instructions are sub-optimal because, according to the processor contextual data, they are using more than one memory access to access a same cache line.

15. The method of claim 10, wherein the buffered instructions comprises scalar instructions and a sequence of one or more optimized instructions comprises SIMD instructions.

16. The method of claim 10, wherein the start-of-sequence instruction includes metadata to provide hints on whether and how to perform substituting.

17. A non-transitory machine-readable medium containing instructions that, when executed by a processor, cause the processor to optimize instructions at run-time by:
   determining that the processor is running in an optimize mode;
   fetching and decoding the instructions using fetch circuitry and decode circuitry;
   buffering decoded instructions in an instruction buffer comprising at least four entries;
   identifying a sequence of sub-optimal instructions comprising three or more of the buffered instructions delimited by a start-of-sequence instruction;
   accessing processor contextual data, including contents of a register file;
   accessing a lookup table of substitute instructions;
   for each buffered instruction, selecting, based on the sequence of sub-optimal instructions, the processor contextual data, and the contents of the lookup table, between the buffered instruction and one or more substitute instructions; and
   an execution circuit to execute the selected instructions.

18. The non-transitory machine-readable medium of claim 17, wherein the sequence of sub-optimal instructions include scalar instructions and the substitute instructions include vector instructions.

19. The non-transitory machine-readable medium of claim 17, wherein the one or more buffered instructions comprises scalar instructions and a sequence of one or more optimized instructions comprises SIMD instructions.

20. The non-transitory machine-readable medium of claim 17, wherein the start-of-sequence instruction includes metadata to provide hints on whether and how to perform substituting.

* * * * *